United States Patent

Lewis

[11] Patent Number: 5,875,248
[45] Date of Patent: Feb. 23, 1999

[54] METHOD OF COUNTERFEIT DETECTION OF ELECTRONIC DATA STORED ON A DEVICE

[75] Inventor: David Otto Lewis, Rochester, Minn.

[73] Assignee: International Business Machines Corporation, Armonk, N.Y.

[21] Appl. No.: 806,876

[22] Filed: Feb. 25, 1997

[51] Int. Cl.[6] .................................................. H04K 1/00
[52] U.S. Cl. .................................................................. 380/4
[58] Field of Search ...................................... 380/4, 23, 25

[56] References Cited

U.S. PATENT DOCUMENTS

| | | | |
|---|---|---|---|
| 4,887,296 | 12/1989 | Horne | 380/21 |
| 5,381,481 | 1/1995 | Gammie et al. | 380/49 |
| 5,495,531 | 2/1996 | Smiedt | 380/4 |

OTHER PUBLICATIONS

"Iterative Pin Generation," IBM Technical Disclosure Bulletin, vol. 29, No. 1, pp. 14–16 (Jun. 1986).

*Primary Examiner*—David Cain
*Attorney, Agent, or Firm*—Daniel E. Venglarik; Andrew J. Dillon

[57] ABSTRACT

A nonvolatile memory is provided with a counterfeit detection mechanism by storing an encryption key and performing cryptographic operations on chip. The encryption key, which is stored in the nonvolatile memory in a protected manner such that it is never exported, is based on unique data within the nonvolatile memory. Unless an expected encryption key calculated from the unique data matches the stored encryption key, the system will not allow the resource containing the nonvolatile memory to be utilized. Equivalence of the expected and stored encryption keys is tested by enciphering and deciphering a random number. The data in the nonvolatile memory may be copied but not altered since each data block includes an electronic signature. Modification of the data in the nonvolatile memory as part of an effort to counterfeit the stored encryption key is therefore useless.

31 Claims, 8 Drawing Sheets

METHOD OF COUNTERFEIT DETECTION OF ELECTRONIC DATA STORED ON A DEVICE

BACKGROUND OF THE INVENTION

1. Technical Field

The present invention relates in general to security features in data processing systems and in particular to security systems employing system component serial numbers in encryption mechanisms. Still more particularly, the present invention relates to preventing data processing system component serial numbers used for encryption type security features from being duplicated or counterfeited.

2. Description of the Related Art

Many software manufacturers write electronic data in nonvolatile memories, such as hard disk drives, to provide system security features. However, because the data is written in a nonvolatile memory, the data can be easily counterfeited, thus bypassing the system security. For example, many data processing systems contain a license manager which utilizes a password to verify that specific software is entitled to run on a specific data processing system. When the software is ordered, a password is sent with the software which enables the code to run on the system. The password is normally based on a serial number stored in some nonvolatile memory in the system. If the system serial number can be counterfeited (copied or duplicated), then the same password may be utilized to enable the software on any data processing system, rather than just the specific data processing system for which the license was purchased. To prevent counterfeiting of the serial numbers, manufacturers need a nonvolatile memory which can be written with data but which also allows the manufacturer to detect whether the data has been modified or copied.

Various attempts have been made to create alteration detection schemes for data written to nonvolatile memory. One method, for example, places a block on nonvolatile memory preventing data from being written to the memory only if privileged commands are utilized. This protection is easily avoided by simply clipping leads onto the nonvolatile memory from an external tester and writing the data. Alternatively, the nonvolatile memory may be simply replaced with a memory chip which was loaded with a copy from another system. This type of protection allows duplication of data or modification of any data by simply "echoing back" the expected results.

A more secure alteration detection method employs an electronic signature placed with the data. Again, however, if the data is copied from another nonvolatile memory chip, the data may be duplicated (but not modified). Since the intent is to prevent duplication and reuse of serial numbers, the security provided by this method is unsatisfactory.

The electronic signature may be made harder to counterfeit by adding a unique chip serial number, generated in another chip (other than the nonvolatile memory chip), to the data containing the system serial number. However counterfeiting is not impossible since the chip serial number may be counterfeited along with the data containing the system serial number so that the electronic signature compares with the expected result. Since any data passed to a processor may be intercepted and counterfeited, only when the chip serial number is on the processor chip will acceptable security be achieved. Putting the serial number on the processor chip achieves acceptable security for a processor card, but does nothing to provide security for other cards in a data processing system.

It would be desirable, therefore, to detect counterfeiting of data contained in a nonvolatile memory, preventing duplication and reuse of serial numbers used as part of a security feature in a data processing system. It would also be advantageous if the mechanism used to detect counterfeiting prevented detection of encryption keys and circumvention of the security feature by echoing back data.

SUMMARY OF THE INVENTION

It is therefore one object of the present invention to provide an improved security feature in a data processing system.

It is another object of the present invention to provide an improved system for employing system component serial numbers in encryption mechanisms used as a security feature.

It is yet another object of the present invention to provide a method of preventing data processing system component serial numbers used for encryption type security features from being duplicated or counterfeited.

The foregoing objects are achieved as is now described. A nonvolatile memory is provided with a counterfeit detection mechanism by storing an encryption key and performing cryptographic operations on chip. The encryption key, which is stored in the nonvolatile memory in a protected manner such that it is never exported, is based on unique data within the nonvolatile memory. Unless an expected encryption key calculated from the unique data matches the stored encryption key, the system will not allow the resource containing the nonvolatile memory to be utilized. Equivalence of the expected and stored encryption keys is tested by enciphering and deciphering a random number. The data in the nonvolatile memory may be copied but not altered since each data block includes an electronic signature. Modification of the data in the nonvolatile memory as part of an effort to counterfeit the stored encryption key is therefore useless.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
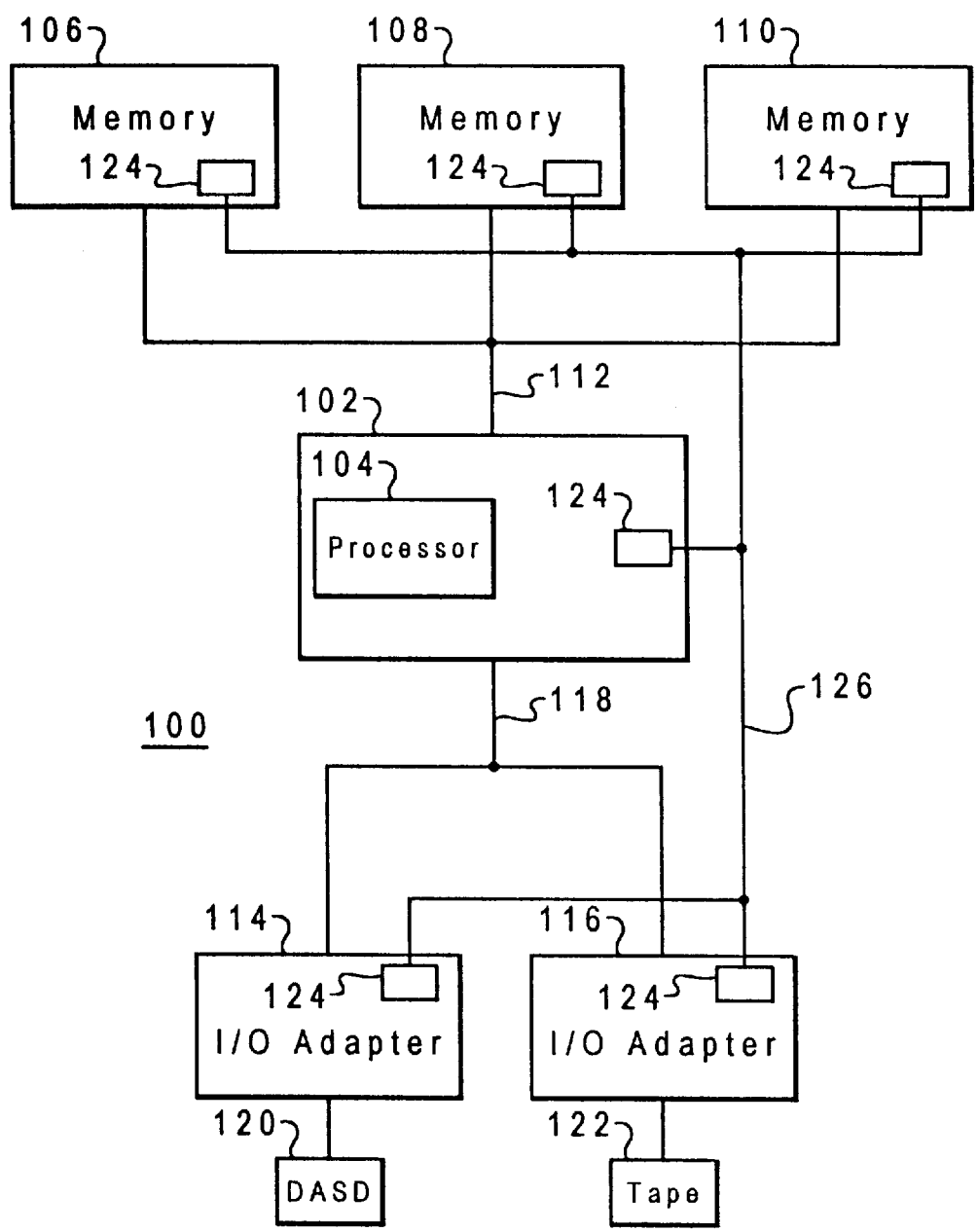
FIG. 1 depicts a block diagram of a data processing system in accordance with a preferred embodiment of the present invention.

With reference now to the figures, and in particular with reference to FIG. 1, a block diagram of a data processing system in accordance with a preferred embodiment of the present invention is depicted. Data processing system 100 includes a processor card 102 containing a processor 104. Processor card 102 is connected to memory cards 106–110 via memory bus 112 and to input/output (I/O) cards 114 and 116 via I/O bus 118. I/O cards 114 and 116 are attached to direct access serial device (DASD) 120 and tape device 122, respectively. Additional memory cards, I/O cards, and I/O devices may be employed in a particular embodiment.

Each card or field replaceable unit (FRU) within data processing system 100—including processor card 102, memory cards 106, 108, and 110, and I/O cards 114 and 116—includes a smart chip 124 connected to other smart chips in data processing system 100 via serial bus 126. Serial bus 126 may be a shared bus as shown in FIG. 1 or may be point to point signals attached to a common bus controller. Smart chips such as smart chip 124 are presently utilized for using bank encryption keys. Although in the depicted example each card includes a smart chip, it is not necessary that all cards in a data processing system have a smart chip for the purposes of the present invention. Moreover, it is also possible that I/O devices may contain a smart chip mounted on a pluggable assembly attached to a DASD device, tape device, or any other I/O device.

Figure 2:
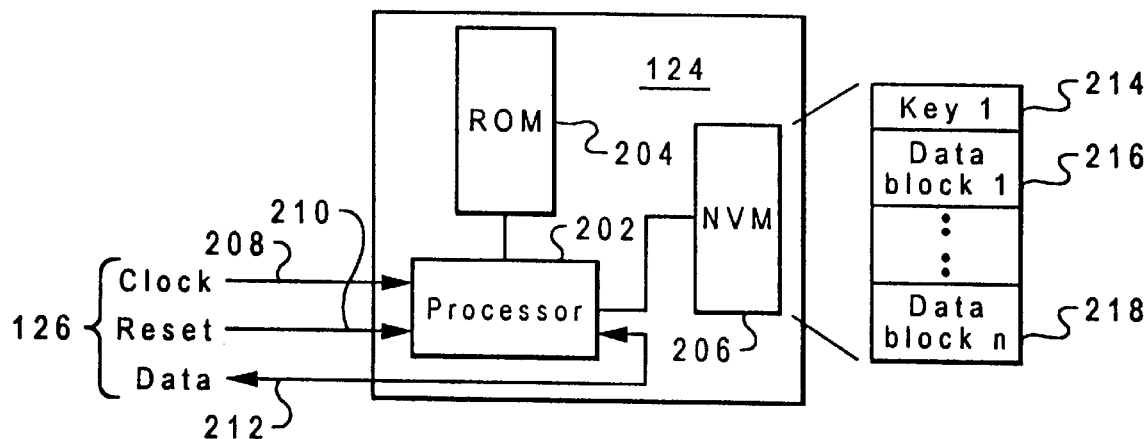
FIG. 2 is a block diagram of a smart chip in accordance with a preferred embodiment of the present invention.

Referring to FIG. 2, a block diagram of a smart chip in accordance with a preferred embodiment of the present invention is portrayed. Smart chip 124 includes a processor 202 connected to read only memory (ROM) 204 and non-volatile memory (NVM) 206 such as an erasable, electrically programmable read only memory (EEPROM). ROM 204 contains instructions which interpret commands sent over serial bus 126. Code in ROM 204 is run in processor 202, controlling operation of smart chip 124 in response to commands sent over serial bus 126. All data transfers to and from smart chip 124 are controlled by the ROM code.

Serial bus 126 to smart chip 124 comprises a clock signal 208, a reset signal 210 and a bi-directional data signal 212. Clock signal 208 provides a common clock reference with an off-chip processor (e.g., processor 104 in FIG. 1) or other component. Reset signal 210 allows smart chip 124 to be reset to a known initialization state. Data signal 212 is a bidirectional signal for receiving commands and data from and transmitting data to an off-chip processor.

Processor 202 waits for a command to be sent over data signal 212 in serial bus 126. By convention, processor 202 does not drive data signal 212 while waiting for a command. When a command and any associated data is received, processor 202 executes the command under the control of ROM 204 and returns any data or response information related to the command over data signal 212. Also by convention, when an off-chip processor or other component is awaiting data or a response from smart chip 124, it does not drive data signal 212. Only a single, bidirectional signal is required between smart chip 124 and an off-chip processor because both smart chip 124 and the off-chip processor know by convention when each can drive data signal 212.

Nonvolatile memory 206 contains data in a format including a first unique encryption key (Key1) 214, at least one data block 216, and optionally up to n additional data blocks 218. Encryption key 214 is used to encipher or decipher data passed with commands over serial bus 126. Encryption key 214 is stored in a special portion of nonvolatile memory 206 which the instructions in ROM 204 preclude from ever being sent back over serial bus 126. Thus, encryption key 214 never leaves smart chip 124.

Figure 3:
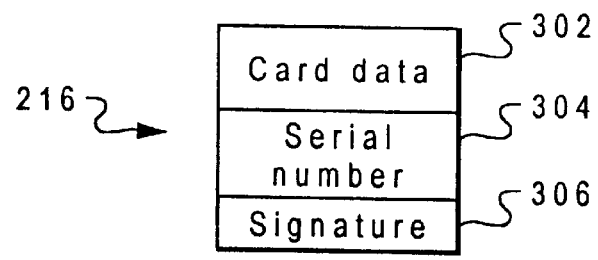
FIG. 3 depicts the format of a data block within a nonvolatile memory in a smart chip in accordance with a preferred embodiment of the present invention.

With reference now to FIG. 3, the format of a data block within a nonvolatile memory in accordance with a preferred embodiment of the present invention is depicted. Each data block within a nonvolatile memory, such as data block 216, contains a card data field 302, a serial number field 304, and a signature field 306. Card data field 302 contains a part number or other specifier uniquely identifying the function of the card containing the smart chip, manufacturing information, and any other configuration data required by the system to configure the card when installed in the system.

Serial number field 304 contains a unique identifier which may be, but is not necessarily, the card serial number. The purpose of serial number field 304 is to provide a unique value on every single card that is different than the value on any other card. Often, the serial number is not unique between cards of a similar type, in which case serial number field 304 contains a unique identifier which is not necessarily related to the card serial number. Serial number field 304 for a given nonvolatile memory must be unique—or at least sufficiently distinctive such that reproduction is a practical impossibility—for a given nonvolatile memory to provide counterfeit detection of a copied data block from another card. The serial number fields are identical, however, for each data block within a given nonvolatile memory unless additional encryption keys based on the other serial number fields are also stored in the nonvolatile memory. Each data block may contain its own unique identifier, with multiple corresponding encryption keys being stored on the nonvolatile memory. Each data block in a nonvolatile memory could then be individually authenticated.

Signature field 306 contains an electronic signature of all bytes in the other fields of the data block. Signature field 306 may contain, for example, a Data Encryption Standard (DES) Message Authentication Code (MAC), which is the most widely used algorithm for creating an electronic signature. The electronic signature permits detection of modification of any bit in the data block. That is, altering any bit within the card data field 302 or serial number field 304 in data block 216 will create an invalid signature. The electronic signature does not, however, prevent duplication of the data block with the same signature.

Figure 4:
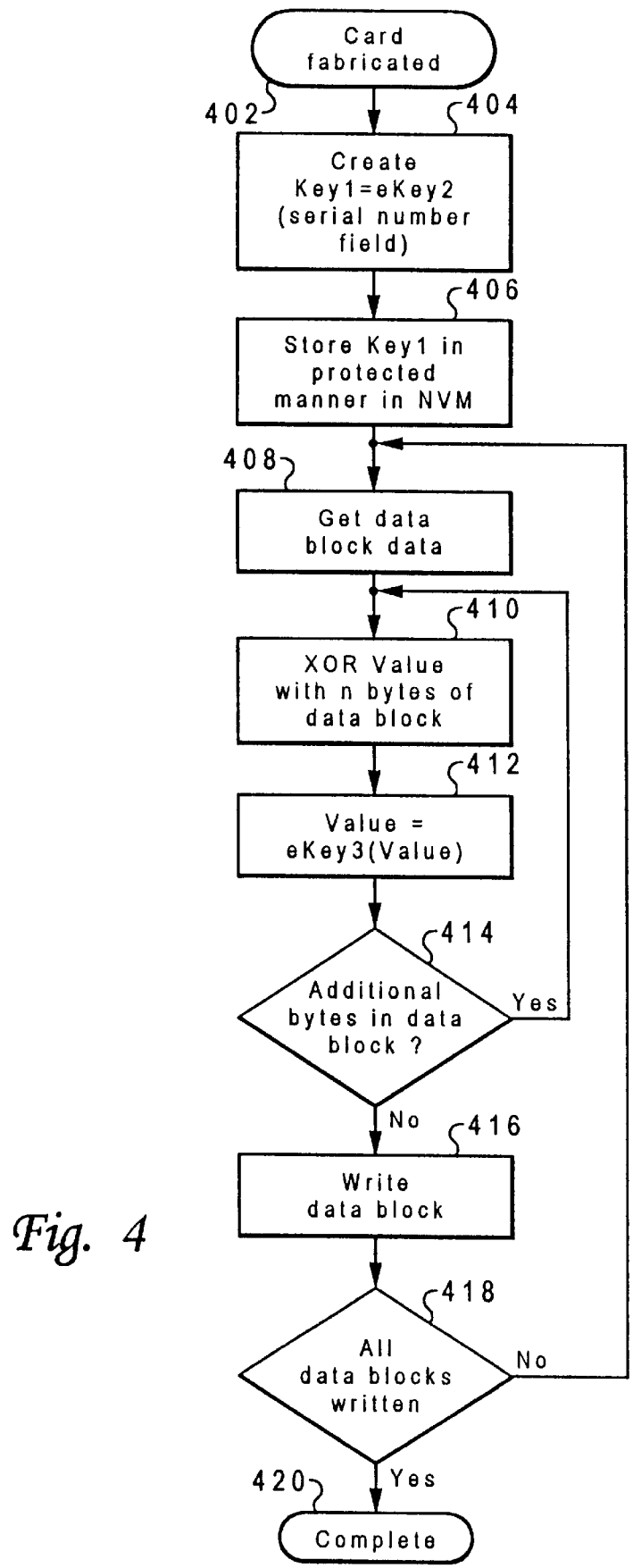
FIG. 4 is a high level flowchart for a process for configuring the nonvolatile memory in a smart chip in accordance with a preferred embodiment of the present invention.

Referring to FIG. 4, a high level flowchart for a process for configuring the nonvolatile memory in a smart chip in accordance with the present invention is portrayed. The process begins at step 402, which depicts the completion of fabrication of a card containing a smart chip. The process then passes to step 404, which illustrates creating a first encryption key Key1 to be stored in the smart chip. The value of Key1 is created by enciphering the unique identifier to be stored in the serial number field of each data block in the nonvolatile memory of the smart chip. Key1 is formed by enciphering the value of the serial number field using a fixed encryption key Key2. The value of Key2 is not stored in any memory on the smart chip, but is known to both the manufacturer and the system.

The value of Key2, which is the same for all cards, is used to calculate the values of Key1 for each card based on the serial number field for a particular card. Therefore, the formation of Key1 need not be based solely on the serial number field in the nonvolatile memory data blocks. Other data from data block 216 depicted in FIG. 2 may also be employed to render more difficult a determination of the exact algorithm utilized to generate encryption key Key1. However, the purpose of encrypting the serial number field using encryption key Key2 is to create a random value for Key1 so that every smart chip will contain a unique random encryption key. Thus, whatever other parameters are utilized as part of the data to be encrypted in forming Key1, the result must be unique to provide a different value than any other value encrypted by Key2.

Following creation of encryption key Key1, the process passes to step 406, which depicts storing Key1 in a protected manner in the nonvolatile memory, such that Key1 cannot be exported outside the smart chip. This anti-export feature may be accomplished either by using a control vector limiting the use of the encryption key Key1 or by implementing ROM code that does not permit any export function. Encryption key Key1 thus insures that data blocks within the nonvolatile memory were not copied from a nonvolatile memory on a different card.

From step 406, the process next passes to step 408, which illustrates fetching the data for a data block to be written to the nonvolatile memory. Typically the data in the data block will contain all necessary data for configuring the card within the card data field. However, the card data field may be empty if the only purpose of the data block to be written is to define a serial number field to be employed in signature verification of other data blocks within the nonvolatile memory.

The process passes next to steps 410, 412, and 414, which depict creation of an electronic signature utilizing the Data Encryption Standard Message Authentication Code algorithm. A MAC may be either an 8 byte or a 16 byte electronic signature. Step 410 illustrates n bytes of the data block data being exclusive ORed (XOR) with a Value, an initial value for the first n bytes of data in the data block. The initial value is known to both the system and the manufacturer. The Value is then encrypted using Key3, an encryption key not stored in the nonvolatile memory but known to both the manufacturer and the system, as depicted in step 412. Step 414 depicts a determination of whether additional bytes remain in the data block data. Steps 410 and 412 are repeated as long as additional data remains: the Value is XORed with the next n bytes of data in the data block, and the result is encrypted using Key3. The result of steps 410–414 is creation of a unique electronic signature for the data block to be written. The value of the enciphering step 412 for the last n bytes of data in the data block is the electronic signature for the signature field. Any process generating a unique electronic signature may be substituted for steps 410–414.

Once the electronic signature for the data block is generated, the process passes to step 416, which illustrates the data block being written to the nonvolatile memory. The card data, serial number, and signature fields of the data block are written to the nonvolatile memory by asserting a ROM-supported write command on the serial bus, along with the data block fields.

The process then passes to step 418, which depicts a determination of whether all data blocks have been written to the nonvolatile memory. Additional data blocks may be created during manufacturing or by the system code. For example, if additional security measures are required or desired, an additional data block may be stored in nonvolatile memory containing an optional personal identification number (PIN). The PIN may be created based on the unique identifier stored in the serial number field. The advantage of including a PIN is that an associated PIN fail limit may be defined. If the PIN is entered incorrectly more than the fail limit value, the smart chip will no longer communicate with the system code. This limits the number of attempts which may be employed in attempting to break the PIN value.

Each data block written to the nonvolatile memory may be protected from counterfeiting by including the unique identifier in the serial number field and a valid electronic signature in the signature field or by storing additional encryption keys based on other unique data fields in other data blocks. Once all data blocks have been written the process proceeds to step 420, which illustrates completion of the process for the nonvolatile memory being written.

Figure 5A:
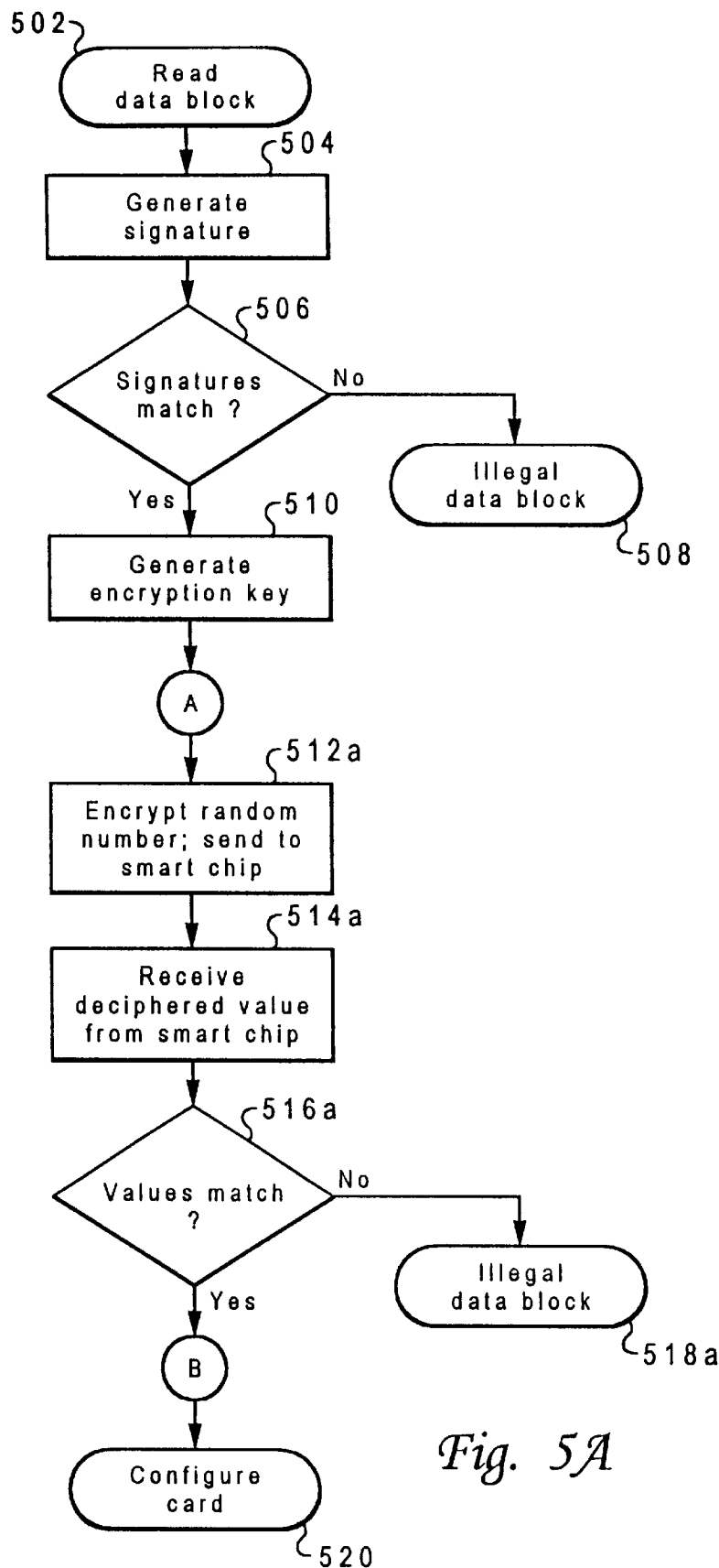
FIGS. 5A–5C depict a high level flowchart for a process for employing the secured data in a nonvolatile memory in accordance with a preferred embodiment of the present invention.
Figure 5B:
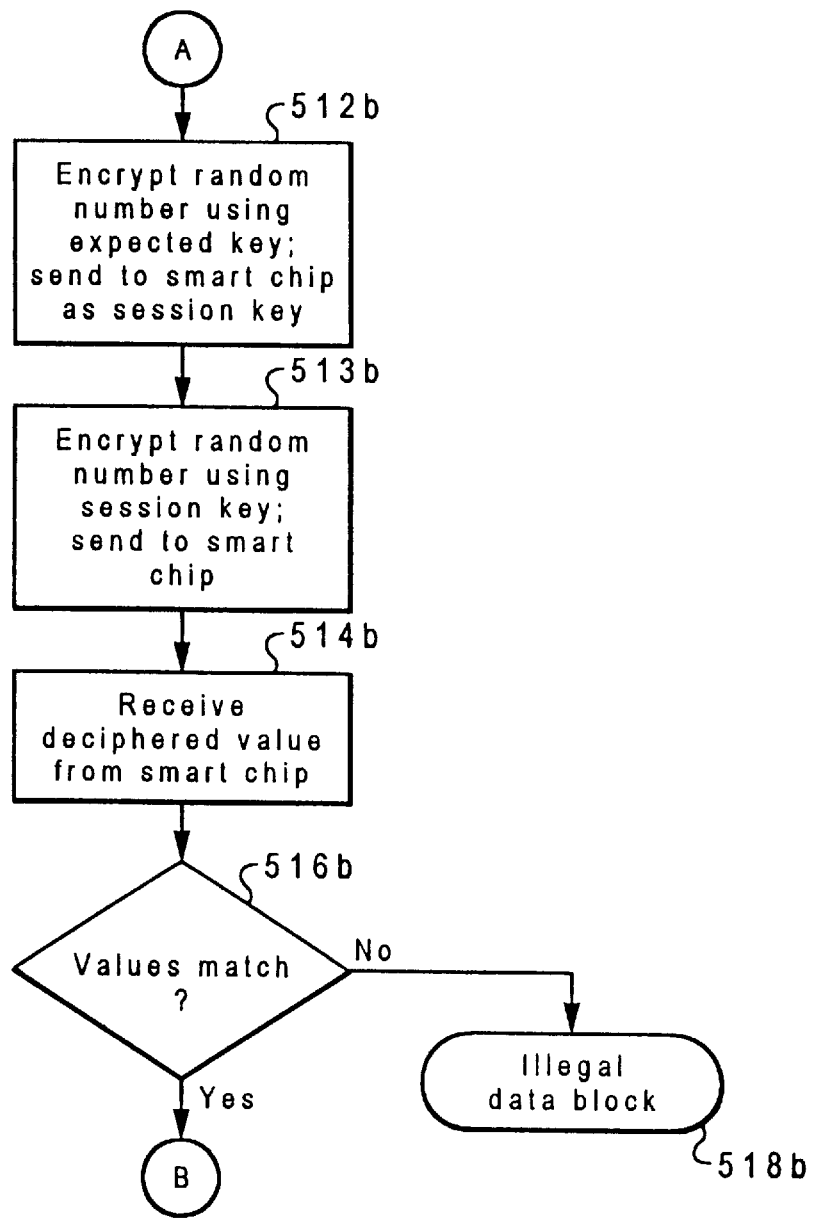
Figure 5C:
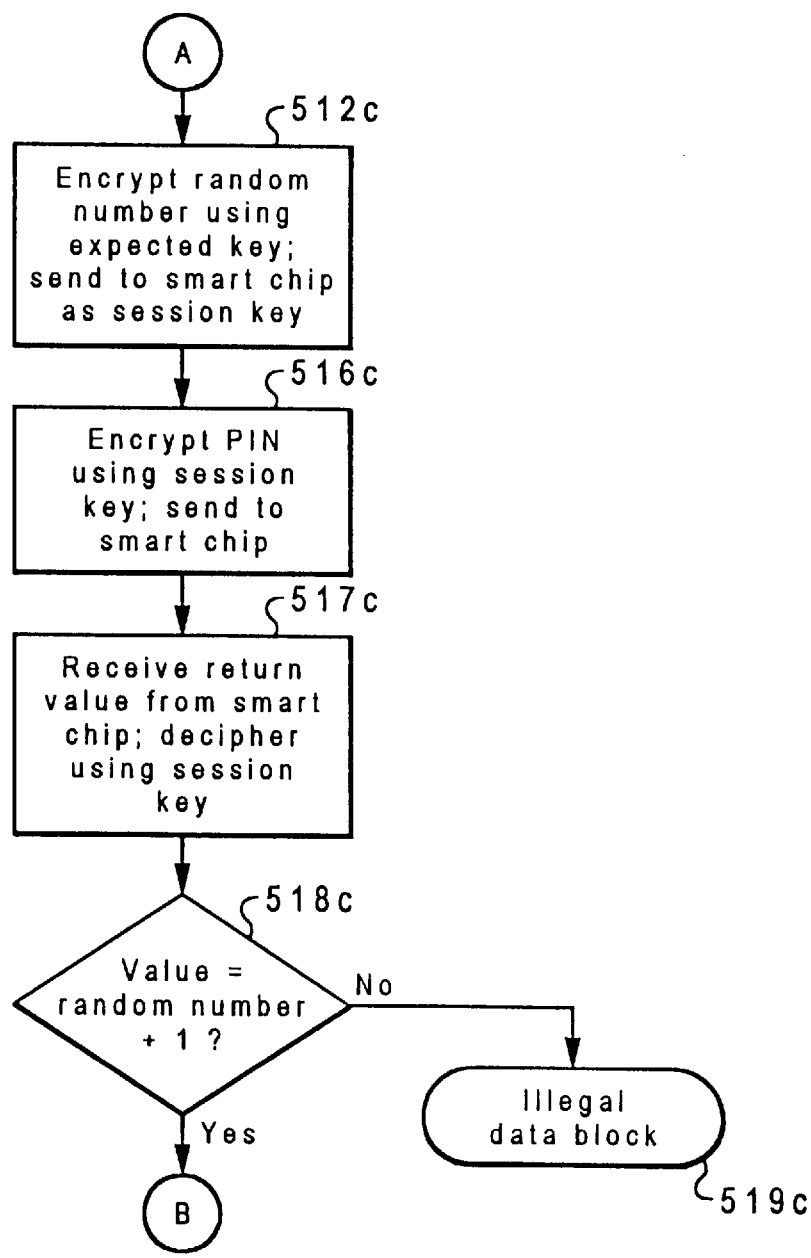

With reference now to FIGS. 5A–5C, a high level flowchart for a process for employing the secured data in a nonvolatile memory in accordance with a preferred embodiment of the present invention is depicted. The process for each of FIGS. 5A–5C begins at step 502, which depicts the data block being read from the card's nonvolatile memory by the code running in processor 104 in FIG. 1. Although described as the system processor above, processor 104 in FIG. 1 could alternatively be an I/O processor or a service processor. The contents of each field in the data block is read by the code executing in the processor. There is no need for secret commands for reading the data in the data block since the data block contains no secret data.

The process then passes to step 504, which illustrates the system code generating an electronic signature across the data block. The system code must know the encryption key Key3 used in generating the electronic signature for the data block. The system code uses encryption key Key3 to create a MAC signature across the data block and verify that the data was not altered or copied. The process then passes to step 506, which depicts comparison of the electronic signature calculated by the system code with the one stored in the data block signature field (signature field 306 in FIG. 3).

With the signature field, alteration of the serial number field in a data block for the purpose of counterfeiting encryption key Key1 may be detected. Any signature mis-compare indicates that the data block is not valid and has been altered. If the signatures compared in step 506 do not match, the process passes to step 508, which illustrates system recognition of an illegal data block. The illegal data block is handled by the system based on the specific policy of the system. For example, the system may simply not configure the card containing the illegal data block, or may not run at all with the card present, depending on the security of the data stored in the counterfeited data block. The process of steps 502–506 is performed for the signature field in every data block on every card, including the processor card, memory cards, and I/O cards. In addition to other policies for handling individual illegal data blocks, the system may have a threshold limit of illegal data blocks, above which the system will not run.

If the electronic signatures compared in step 506 match, the process passes instead to step 510, which depicts generation of an encryption key from the serial number field of the data block using encryption key Key2. The system code must next check each smart chip on each card to verify that the smart chip manufactured with the unique identifier in the serial number field is actually present in the system, rather than a smart chip with the data block from another card copied into the data block, complete with signature field. The system code creates an expected encryption key for the smart chip by duplicating the process performed during manufacturing. The unique identifier in the serial number fields on each smart chip and encryption key Key2 are used to calculate the expected encryption key Key1 for each respective smart chip. The encryption key generated by the system code from the unique identifier in the serial number field and encryption key Key2 should match the encryption code stored on the smart chip. However, since the system code cannot read the encryption key Key1 from the smart chip (nor can any other code), a separate mechanism must be employed to verify the encryption key Key1.

Different techniques may be utilized by the system for verifying the encryption key Key1 for each smart chip. In the simplest technique, the process passes to step 512a, which depicts encrypting a random number using the expected encryption key (which should be the same as Key1) and sending the enciphered number to the smart chip via the serial bus with an instruction to decipher the encrypted random number and return the deciphered value in clear text (deciphered) form. A random number is utilized since use of a fixed value would generate a predictable result, creating an opportunity for the result to later be echoed back. When a random number is used, the returned result from the smart chip cannot be predicted by looking at a previous result or results from a valid card.

When the deciphered value is received by the system code from the smart chip on the serial bus, as illustrated in step 514a, the process then passes to step 516a, which illustrates comparison of the deciphered value returned by the smart chip with the random number encrypted by the system code. If the two numbers do not match, the process proceeds to step 518a, which illustrates invoking the system policy for an illegal data block. If the value returned by the smart chip matches the random number encrypted by the system, the process passes to step 520, which illustrates the process continuing with required tasks such as configuring the cards containing the smart chips.

FIG. 5B depicts an alternative process for verifying the data blocks in a smart chip nonvolatile memory. As with the previous alternative, the system code encrypts a random number using the expected encryption key and sends the enciphered value to the smart chip. However, as depicted in step 512b, the random number from which the encrypted value was calculated is used as a session key. The smart chip deciphers the encrypted value using the stored encryption key Key1 and retains the decrypted number as a session key. The process then passes to step 513b, which illustrates the system encrypting a random number using the session key and sending the new encrypted value to the smart chip with an instruction to decipher the value using the session key and return the deciphered value. When the system receives the deciphered value from the smart chip, as depicted in step 514b, the process passes to step 516b, which illustrates comparison of the value received from the smart chip with the random number encrypted with the session key. As with the previous alternative, if the values do not match, the process proceeds to step 518b, invoking the system policy for an illegal data block. If, on the other hand, the values match, the process passes instead to step 520 and continues with normal operation.

The alternative depicted in FIG. 5B adds an additional level of difficulty to efforts directed toward determining the stored encryption key Key1 from a value received from the smart chip. This alternative is suitable for complex transfers with a smart chip where fixed data is sent over the interface and the data pattern would be the same even if enciphered by the smart chip. A session key need not be employed if the only operation required is to verify that the encryption key stored in the smart chip matches the expected encryption key.

Yet another alternative process for verifying the data blocks in a smart chip nonvolatile memory is depicted in FIG. 5C. This alternative employs the optional PIN created for the smart chip based on the unique identifier in the serial number field and stored in the ship. Because the PIN must be kept secret, it cannot be sent in clear text form to the smart chip. Moreover, the encryption value which the system expects is stored in the smart chip nonvolatile memory should not be used since the PIN value remains constant. Therefore, the system first encrypts a random number using the expected encryption key and sends the encrypted value to the smart chip to be used as a session key. The system also sends an instruction to decipher the encrypted session key and save the session key as illustrated in step 512c. Once the session key is saved in the smart chip, the process proceeds to step 516c.

Step 516c depicts encryption of the smart chip PIN and a random number by the system using the session key loaded in step 512c. The encrypted PIN and random number are sent to the smart chip with an instruction to decipher both, verify the PIN, and return the random number incremented by a predetermined amount and encrypted using the session key. A predetermined value of one will be used as an example. When the system receives a return value from the smart chip as illustrated in step 517c, the system deciphers the return value using the session key. The process then passes to step 518c, which depicts a determination of whether the deciphered return value equals the random number sent in step 516c incremented by one. If so, the process proceeds to step 520 as described in previous alternatives. If not, however, the process proceeds instead to step 519c, which illustrates an invocation of the system policy for an illegal smart chip. The system policy for illegal smart chips may differ from the policy for illegal data blocks since some security penetration has been detected. The policy may therefore be as severe as disabling the card containing the smart chip from further operation until the smart chip is replaced.

Figure 6A:
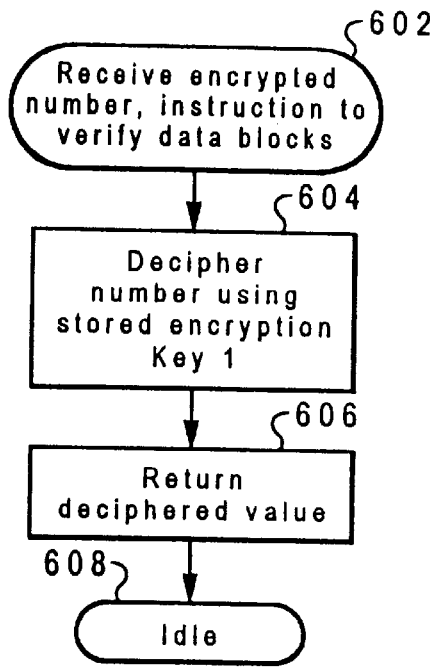
FIGS. 6A–6C are high level flowcharts for processes within a smart chip for responding to a verification request in accordance with a preferred embodiment of the present invention.
Figure 6B:
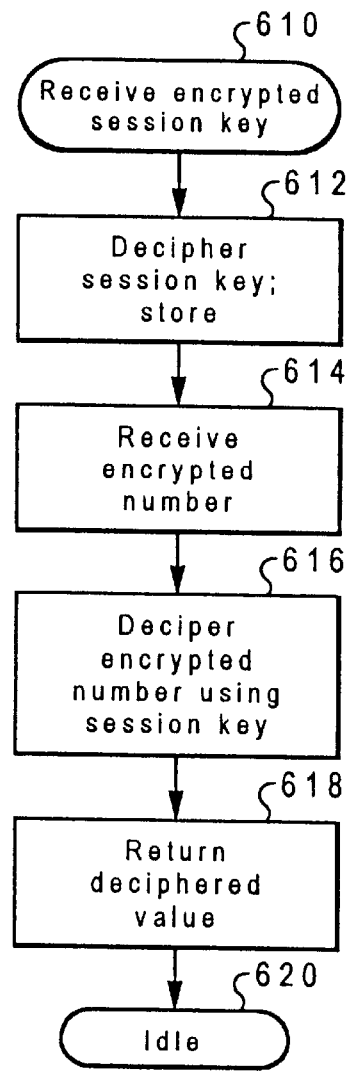
Figure 6C:
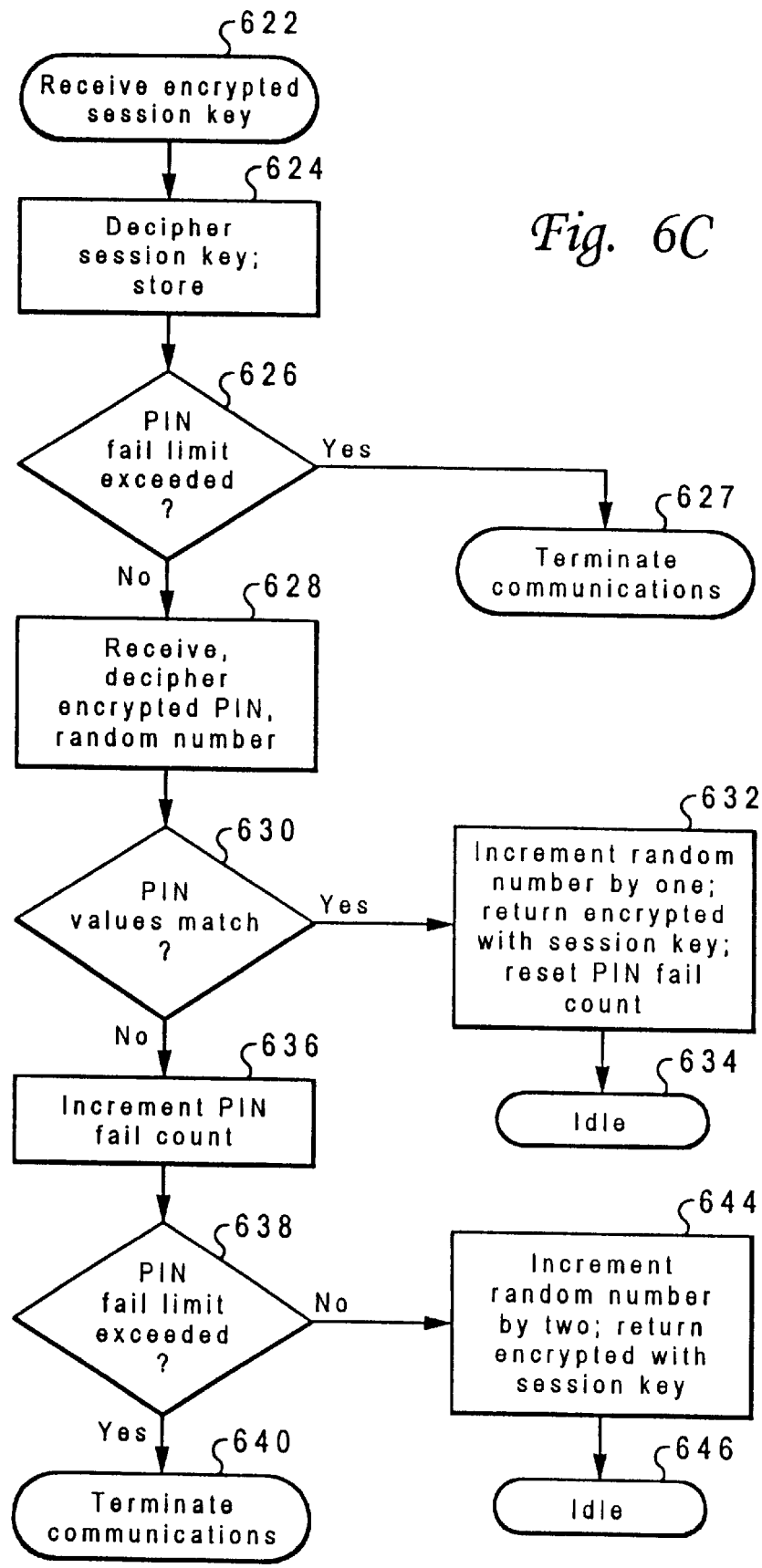

Referring to FIGS. 6A–6C, high level flowcharts for processes within a smart chip for responding to a verification request in accordance with a preferred embodiment of the present invention are portrayed. The processes are employed by the smart chip to verify the data blocks in the smart chip nonvolatile memory or the smart chip itself.

The process depicted in FIG. 6A begins at step 602, which illustrates receipt by the smart chip of an encrypted number to verify the data block containing the serial number is present in the nonvolatile memory of the smart chip. The process then passes to step 604, which depicts the smart chip deciphering the encrypted number using the encryption key Key1 stored in the nonvolatile memory. The process passes next to step 606, which illustrates the smart chip returning a deciphered value on the serial bus in clear text form. The process then passes to step 608, which depicts the process becoming idle until again required.

The process depicted in FIG. 6B begins at step 610, which illustrates the smart chip receiving an encrypted session key. The process then passes sequentially through step 612, which depicts the smart chip deciphering the session key using the stored encryption key Key1 and storing the session key, step 614, which illustrates the smart chip receiving an encrypted number, and step 616, which depicts the smart chip deciphering the encrypted number using the session key. The process next passes to step 618, which illustrates the smart chip returning the deciphered value of the encrypted number in clear text form, and then to step 620, which depicts the process becoming idle until required again.

The process depicted in FIG. 6C begins at step 622, which illustrates receipt of an encrypted session key by the smart chip. The process then passes to step 624, which depicts the smart chip deciphering the session key with the stored encryption key Key1 and storing the deciphered session key in a register of processor 202 depicted in FIG. 2. The process next passes to step 626, which illustrates a determination of whether the PIN fail limit was previously exceeded. In step 626, the smart chip compares the PIN fail count to the PIN fail limit and, if the PIN fail count is greater than the PIN fail limit, the process proceeds to step 627, which depicts termination of communications to the system. At this point, the smart chip becomes unusable and no counterfeiting attacks will be possible to allow the smart chip to communicate again. If the PIN fail limit was not exceeded, the process next passes to step 628, which depicts the smart chip receiving, in encrypted form, the smart chip's PIN and a random number. The smart chip deciphers both values using the session key.

The process next passes to step 630, which illustrates a determination of whether the deciphered PIN value matches the PIN value stored in a data block within the smart chip nonvolatile memory. If so, the process proceeds to step 632, which depicts the smart chip incrementing the random number received by one, encrypting the incremented value using the session key, and returning the encrypted, incremented value. By examining the returned value, it is not possible to determine whether the PIN is correct unless the session key is known. The smart chip also resets the PIN fail count, which is maintained in a data block in the nonvolatile memory. The process then passes to step 634, which illustrates the process becoming idle until again required.

If the smart chip determines in step 630 that the PIN value received and deciphered using the session key is incorrect, the process proceeds instead to step 636, which depicts the smart chip incrementing the PIN fail count. The process then passes to step 638, which illustrates a determination of whether the PIN fail limit has been exceeded. If so, the process proceeds to step 640, which depicts the smart chip taking an appropriate action such as terminating communications to the system. If not, however, the process proceeds instead to step 644, which depicts the smart chip incrementing the random number received by two (or any number other than one), encrypting the incremented value using the session key, and returning the encrypted, incremented value. The process then passes to step 646, which illustrates the process becoming idle until once again required.

The nonvolatile memory of a smart chip may be loaded with data blocks, other than during manufacturing, by copying the data block from another card. However, the encryption key stored in the smart chip nonvolatile memory cannot be duplicated because the contents are never seen, only the results when a random number is deciphered. As an additional protection, however, the ROM can be configured to clear the encryption key field of the nonvolatile memory whenever a data block is overwritten. Thus, when overwriting the data in a data block, the encryption key must also be generated and stored. This is not possible unless both the value of Key2 and the algorithm for calculating Key1 are both known. These values are only known to the system and the manufacturer.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

The security feature of the present invention prevents duplication and reuse of system serial numbers and is not susceptible to echo techniques. Use of the expected and stored encryption keys to encipher and decipher a random number closes exposure to echo techniques. The encryption key is loaded in a secure manner such that the data cannot be monitored when the key is loaded. The encryption key never leaves the card, but is only used to decipher random numbers sent by the system code to verify that the encryption key stored in the nonvolatile memory is the same as that calculated by the system. The stored encryption key may be used to detect license violations or, by detecting alteration of a card serial number, to eliminate warranty fraud.

Even if the nonvolatile memory contents were read from the chip to obtain a stored encryption key—requiring a very expensive chip process—the algorithm for generating the encryption key remains unexposed. To make the encryption key less susceptible to attempts to crack the encryption algorithm, the encryption key is itself the result of an encryption process.

While the invention has been particularly shown and described with reference to a preferred embodiment, it will be understood by those skilled in the art that various changes in form and detail may be made therein without departing from the spirit and scope of the invention.

What is claimed is:

1. A method of enabling detection of counterfeit components in a data processing system, comprising:

storing a unique identifier in a nonvolatile memory forming a part of an integrated circuit in said data processing system; and storing an encryption key in said nonvolatile memory in a manner precluding export of said encryption key from said integrated circuit, said encryption key calculated by enciphering said unique identifier, wherein a unique encryption key for said nonvolatile memory is provided to enable detection of counterfeit components.

2. The method of claim 1, further comprising:

storing an electronic signature of selected data within said nonvolatile memory in said nonvolatile memory, said selected data including said unique identifier.

3. A method of detecting counterfeit components in a data processing system, comprising:

reading a unique identifier stored in a nonvolatile memory in said data processing system;

calculating an expected encryption key by enciphering said unique identifier;

enciphering a random number using said expected encryption key to generate an enciphered random number; and transmitting said enciphered random number to a processor associated with said nonvolatile memory, wherein counterfeit components within said data processing system may be detected.

4. The method of claim 3, further comprising:

receiving, from said processor, a deciphered number calculated from said enciphered random number using an encryption key stored in said nonvolatile memory;

comparing said deciphered number to said random number; and responsive to determining that said deciphered number is not equal to said random number, initiating a procedure for responding to detection of counterfeit components.

5. The method of claim 3, further comprising:

reading selected data from said nonvolatile memory;

computing an electronic signature of said selected data;

comparing said electronic signature to a stored electronic signature stored in said nonvolatile memory; and responsive to determining that said electronic signature is not equal to said stored electronic signature, initiating a procedure for responding to detection of counterfeit components.

6. The method of claim 3 wherein said random number comprises a session key and said enciphered random number comprises an enciphered session key, the method further comprising:

enciphering a second random number using said session key to generate a second enciphered random number;

transmitting said second enciphered random number to said processor;

receiving, from said processor, a deciphered number calculated from said second enciphered random number using a computed session key, said computed session key calculated from said enciphered session key using an encryption key stored in said nonvolatile memory;

comparing said deciphered number to said second random number; and responsive to determining that said deciphered number is not equal to said second random number, initiating a procedure for responding to detection of counterfeit components.

7. The method of claim 3 wherein said random number comprises a session key and said enciphered random number comprises an enciphered session key, the method further comprising:

enciphering a PIN for said nonvolatile memory and a second random number using said session key to generate an enciphered PIN and a second enciphered random number;

transmitting said enciphered PIN and said second enciphered random number to said processor, said processor deciphering said enciphered PIN and said second enciphered random number using a computed session key, said computed session key calculated from said enciphered session key using an encryption key stored in said nonvolatile memory;

receiving a return number enciphered using said computed session key;

deciphering said return number using said session key to generate a deciphered number;

comparing said deciphered number to said second random number incremented by a first value; and responsive to determining that said deciphered number is not equal to said second random number incremented by a first value, initiating a procedure for responding to detection of counterfeit components.

8. An apparatus for detecting counterfeit components in a data processing system, comprising:

memory access means for reading a unique identifier stored in a nonvolatile memory in said data processing system;

calculating means for calculating an expected encryption key by enciphering said unique identifier;

encryption means for enciphering a random number using said expected encryption key to generate an enciphered random number; and transmission means for transmitting said enciphered random number to a processor associated with said nonvolatile memory, wherein counterfeit components within said data processing system may be detected.

9. The apparatus of claim 8, further comprising:

receiving means for receiving a deciphered number calculated from said enciphered random number using an encryption key stored in said nonvolatile memory;

comparing means for comparing said deciphered number to said random number; and means responsive to determining that said deciphered number is not equal to said random number for initiating a procedure for responding to detection of counterfeit components.

10. The apparatus of claim 8, further comprising:

memory access means for reading selected data from said nonvolatile memory;

computing means for computing an electronic signature of said selected data;

comparing means for comparing said electronic signature to a stored electronic signature stored in said nonvolatile memory; and means responsive to determining that said electronic signature is not equal to said stored electronic signature for initiating a procedure for responding to detection of counterfeit components.

11. The apparatus of claim 8 wherein said random number comprises a session key and said enciphered random number comprises an enciphered session key, the apparatus further comprising:

encryption means for enciphering a second random number using said session key to generate a second enciphered random number;

transmission means for transmitting said second enciphered random number to said processor;

receiving means for receiving a deciphered number calculated from said second enciphered random number using a computed session key, said computed session key calculated from said enciphered session key using an encryption key stored in said nonvolatile memory;

comparing means for comparing said deciphered number to said second random number; and means responsive to determining that said deciphered number is not equal to said second random number for initiating a procedure for responding to detection of counterfeit components.

12. The apparatus of claim 8 wherein said random number comprises a session key and said enciphered random number comprises an enciphered session key, the apparatus further comprising:

encryption means for enciphering a PIN for said nonvolatile memory and a second random number using said session key to generate an enciphered PIN and a second enciphered random number;

transmission means for transmitting said enciphered PIN and said second enciphered random number to said processor, said processor deciphering said enciphered PIN and said second enciphered random number using a computed session key, said computed session key calculated from said enciphered session key using an encryption key stored in said nonvolatile memory;

receiving means for receiving a return number enciphered using said computed session key;

decryption means for deciphering said return number using said session key to generate a deciphered number;

comparing means for comparing said deciphered number to said second random number incremented by a first value; and means responsive to determining that said deciphered number is not equal to said second random number incremented by first value for initiating a procedure for responding to detection of counterfeit components.

13. A nonvolatile memory forming a portion of an integrated circuit on a component within a data processing system, said nonvolatile memory enabling detection of counterfeit components in said data processing system, comprising:

at least one data block stored in said nonvolatile memory, said data block including a unique identifier for said nonvolatile memory and an electronic signature of said data block; and an encryption key stored in said nonvolatile memory in a manner precluding export of said encryption key from said integrated circuit containing said nonvolatile memory, said encryption key calculated by enciphering said unique identifier.

14. A mechanism for detecting counterfeit components in a data processing system, comprising:

a nonvolatile memory forming a portion of an integrated circuit within said data processing system;

at least one data block stored in said nonvolatile memory, said data block including a unique identifier for said nonvolatile memory and an electronic signature of said data block; and at least one encryption key stored in said nonvolatile memory in a manner precluding export of said encryption key from said integrated circuit containing said nonvolatile memory, said at least one encryption key calculated by enciphering said unique identifier.

15. The mechanism of claim 1 4 wherein said at least one data block further comprises a plurality of data blocks stored in said nonvolatile memory, each respective data block within said plurality of data blocks including said unique identifier for said nonvolatile memory and an electronic signature of said respective data block.

16. The mechanism of claim 14 wherein:

said at least one data block further comprises a plurality of data blocks stored in said nonvolatile memory, each respective data block within said plurality of data blocks including a different unique identifier and an electronic signature of said respective data block; and said at least one encryption key further comprises a plurality of encryption keys stored in said nonvolatile memory in a manner precluding export of said encryption keys from said integrated circuit containing said nonvolatile memory, each encryption key within said plurality of encryption keys calculated by enciphering a unique identifier contained within a data block in said nonvolatile memory.

17. The mechanism of claim 14, further comprising:

a PIN stored in said nonvolatile memory.

18. The mechanism of claim 14, further comprising:

a read only memory in said integrated circuit containing said nonvolatile memory; and a processor in said integrated circuit connected to said read only memory and executing instructions contained within said read only memory, said processor connected to said nonvolatile memory and capable of reading both said encryption key and said at least one data block.

19. The mechanism of claim 18, further comprising:

a bus connected to said processor, said bus transmitting instructions and data from a second processor in said data processing system, said instructions directing said processor to encipher or decipher said data.

20. A method of signaling presence of a counterfeit component within a data processing system, comprising:

storing a unique identifier for a component within said data processing system in a memory on said component;

storing an encryption key calculated by enciphering said unique identifier in said memory, wherein the encryption key comprises a stored encryption key;

receiving an encrypted number calculated from a random number using an expected encryption key, said expected encryption key computed by enciphering said unique identifier; and transmitting a signal indicating whether said component is counterfeited.

21. The method of claim 20 wherein said step of transmitting a signal indicating whether said component is counterfeited further comprises:

deciphering said encrypted number using said stored encryption key to generate a deciphered number; and transmitting said deciphered number.

22. The method of claim 20 wherein said random number comprises a session key and said encrypted number comprises an encrypted session key, the method further comprising:

computing a computed session key by deciphering said encrypted session key using said stored encryption key;

receiving a second encrypted number calculated from a second random number using said session key;

deciphering said second encrypted number using said computed session key to generate a deciphered number; and transmitting said deciphered number.

23. The method of claim 20 wherein said random number comprises a session key and said encrypted number comprises an encrypted session key, the method further comprising:

computing a computed session key by deciphering said encrypted session key using said stored encryption key;

receiving an encrypted PIN calculated from a PIN using said session key and a second encrypted number calculated from a second random number using said session key;

deciphering said encrypted PIN and said second encrypted number using said computed session key to generate a deciphered PIN and a deciphered number;

comparing said deciphered PIN to a stored PIN stored in said memory;

responsive to determining that said deciphered PIN equals said stored PIN, incrementing said deciphered number by a first value to generate an incremented number;

enciphering said incremented number using said computed session key to generate an enciphered incremented number; and transmitting said enciphered incremented number.

24. A computer program product for use with a data processing system, comprising:

a computer usable medium;

first instructions on said computer usable medium for reading a unique identifier stored in a nonvolatile memory in said data processing system;

second instructions on said computer usable medium for calculating an expected encryption key by enciphering said unique identifier;

third instructions on said computer usable medium for enciphering a random number using said expected encryption key to generate an enciphered random number; and fourth instructions on said computer usable medium for transmitting said enciphered random number to a processor associated with said nonvolatile memory, wherein said computer usable medium contains a mechanism for detecting counterfeit components within said data processing system.

25. The computer program product of claim 24, further comprising:

fifth instructions on said computer usable medium for reading a stored electronic signature stored in said nonvolatile memory;

sixth instructions on said computer usable medium for computing a computed electronic signature from selected data in said nonvolatile memory; and seventh instructions on said computer usable medium for comparing said computed electronic signature to said stored electronic signature.

26. The computer program product of claim 24, further comprising:

fifth instructions on said computer usable medium for receiving a deciphered number from said processor associated with said nonvolatile memory; and sixth instructions on said computer usable medium for comparing said deciphered number to said random number.

27. A computer program product for use with a data processing system, comprising:

a computer usable medium;

first instructions on said computer usable medium for receiving an encrypted number;

second instructions on said computer usable medium for deciphering said encrypted number using an encryption key calculated by enciphering a unique identifier for a component within said data processing system, said second instructions generating a deciphered number; and third instructions on said computer usable medium for transmitting said deciphered number, wherein said computer usable medium contains a mechanism for transmitting a signal indicating whether said component is counterfeited.

28. A method of discovering counterfeit components in a data processing system, comprising:

reading a unique identifier stored in a nonvolatile memory in a device on a component within said data processing system;

calculating an expected encryption key by enciphering said unique identifier;

enciphering a random number using said expected encryption key to generate an enciphered random number; and transmitting said enciphered random number to said device, wherein counterfeit components within said data processing system may be discovered.

29. The method of claim 28, further comprising:

deciphering, in said device, said enciphered random number using an encryption key stored in said nonvolatile memory to calculate a deciphered number;

receiving, from said device, said deciphered number;

comparing said deciphered number to said random number; and responsive to determining that said deciphered number is not equal to said random number, initiating a procedure for responding to detection of counterfeit components.

30. The method of claim 28 wherein said random number comprises a session key and said enciphered random number comprises an enciphered session key, the method further comprising:

deciphering said enciphered session key in said device using an encryption key stored in said nonvolatile memory to generate a deciphered session key;

storing said deciphered session key in said device;

enciphering a second random number using said session key to generate a second enciphered random number;

transmitting said second enciphered random number to said device;

deciphering, in said device, said second enciphered random number using said deciphered session key to calculate a deciphered number;

receiving, from said device, said deciphered number;

comparing said deciphered number to said second random number; and responsive to determining that said deciphered number is not equal to said second random number, initiating a procedure for responding to detection of counterfeit components.

31. The method of claim 28 wherein said random number comprises a session key and said enciphered random number comprises an enciphered session key, the method further comprising:

deciphering said enciphered session key in said device using an encryption key stored in said nonvolatile memory to generate a deciphered session key;

storing said deciphered session key in said device;

enciphering a PIN for said nonvolatile memory and a second random number using said deciphered session key to generate an enciphered PIN and a second enciphered random number;

transmitting said enciphered PIN and said second enciphered random number to said device;

deciphering, in said device, said enciphered PIN and said second enciphered random number using said deciphered session key to generate a deciphered PIN and a deciphered number;

comparing said deciphered PIN to a stored PIN stored in said nonvolatile memory;

responsive to determining that said deciphered PIN equals said stored PIN, incrementing said deciphered number by a first value to generate an incremented deciphered number;

responsive to determining that said deciphered PIN does not equal said stored PIN, incrementing said deciphered number by a second value to generate said incremented deciphered number;

enciphering said incremented deciphered number using said deciphered session key to generate a return number;

receiving said return number;

deciphering said return number using said session key to generate a deciphered return number;

comparing said deciphered return number to said second random number; and responsive to determining that said deciphered return number is not equal to said second random number incremented by said first value, initiating a procedure for responding to detection of counterfeit components.

* * * * *